(12) United States Patent
Barnes et al.

(10) Patent No.: US 7,725,432 B2
(45) Date of Patent: May 25, 2010

(54) LOGGING LAST RESOURCE SYSTEM

(75) Inventors: Thomas E. Barnes, Whitehouse Station, NJ (US); Adam Messinger, San Francisco, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 392 days.

(21) Appl. No.: 11/130,687

(22) Filed: May 17, 2005

(65) Prior Publication Data

US 2005/0262077 A1 Nov. 24, 2005

Related U.S. Application Data

(60) Provisional application No. 60/573,263, filed on May 21, 2004.

(51) Int. Cl.
 G06F 12/00 (2006.01)
 G06F 17/30 (2006.01)
 G06F 15/16 (2006.01)
 G06F 11/00 (2006.01)
(52) U.S. Cl. .......................... 707/611; 709/248; 714/16
(58) Field of Classification Search ................. 707/201; 714/1–5, 16; 709/248
See application file for complete search history.

(56) References Cited

U.S. PATENT DOCUMENTS

| 5,870,757 A | 2/1999 | Fuller | |
| 6,009,405 A * | 12/1999 | Leymann et al. | 705/9 |
| 6,535,868 B1 * | 3/2003 | Galeazzi et al. | 707/2 |
| 6,817,018 B1 | 11/2004 | Clarke et al. | |
| 2003/0046258 A1 * | 3/2003 | Candee et al. | 707/1 |
| 2004/0078495 A1 * | 4/2004 | Mousseau et al. | 710/1 |

OTHER PUBLICATIONS

Gray, et al., "Transaction Processing: Concepts and Techniques", 1993, pp. 1-2, 631-655, Morgan Kaufmann Publishers, San Francisco, CA.

* cited by examiner

*Primary Examiner*—Hosain T Alam
*Assistant Examiner*—Van H Ngo
(74) *Attorney, Agent, or Firm*—Fliesler Meyer LLP

(57) ABSTRACT

A logging last resource (LLR) system can provide a transaction log and transaction data to a LLR resource after a number of two-phase-commit resources have been prepared. The LLR resource manager can operate on the transaction log and transaction data in an atomic fashion so that the local commit can be done. The local commit can be done by the LLR manager in an atomic manner.

33 Claims, 3 Drawing Sheets

LOGGING LAST RESOURCE SYSTEM

CLAIM OF PRIORITY

This application claims priority to U.S. Provisional Application No. 60/573,263 entitled "Logging Last Resource" filed May 21, 2004 by Thomas E. Barnes et al.

FIELD OF INVENTION

The present invention relates to transactions using multiple resources.

BACKGROUND OF INVENTION

In many cases, transaction processing requires the use of multiple resources. Typically, each of the resources can maintain Atomic, Consistent, Isolated, and Durable (ACID) properties. A transaction manager is often used to maintain the ACID properties over multiple resources. For example, consider a single transaction involving the changing of an account balance in a database and sending of a wire transfer. It is crucial that both portions of the transaction either both occur or both do not occur. Otherwise, either the bank balance is debited without a wire transfer or the funds are transferred without debiting the bank account. Such a failure of the transaction is called a heuristic failure. If neither portions of the transaction occur, the transaction can rolled back and tried again.

DETAILED DESCRIPTION

Figure 1:
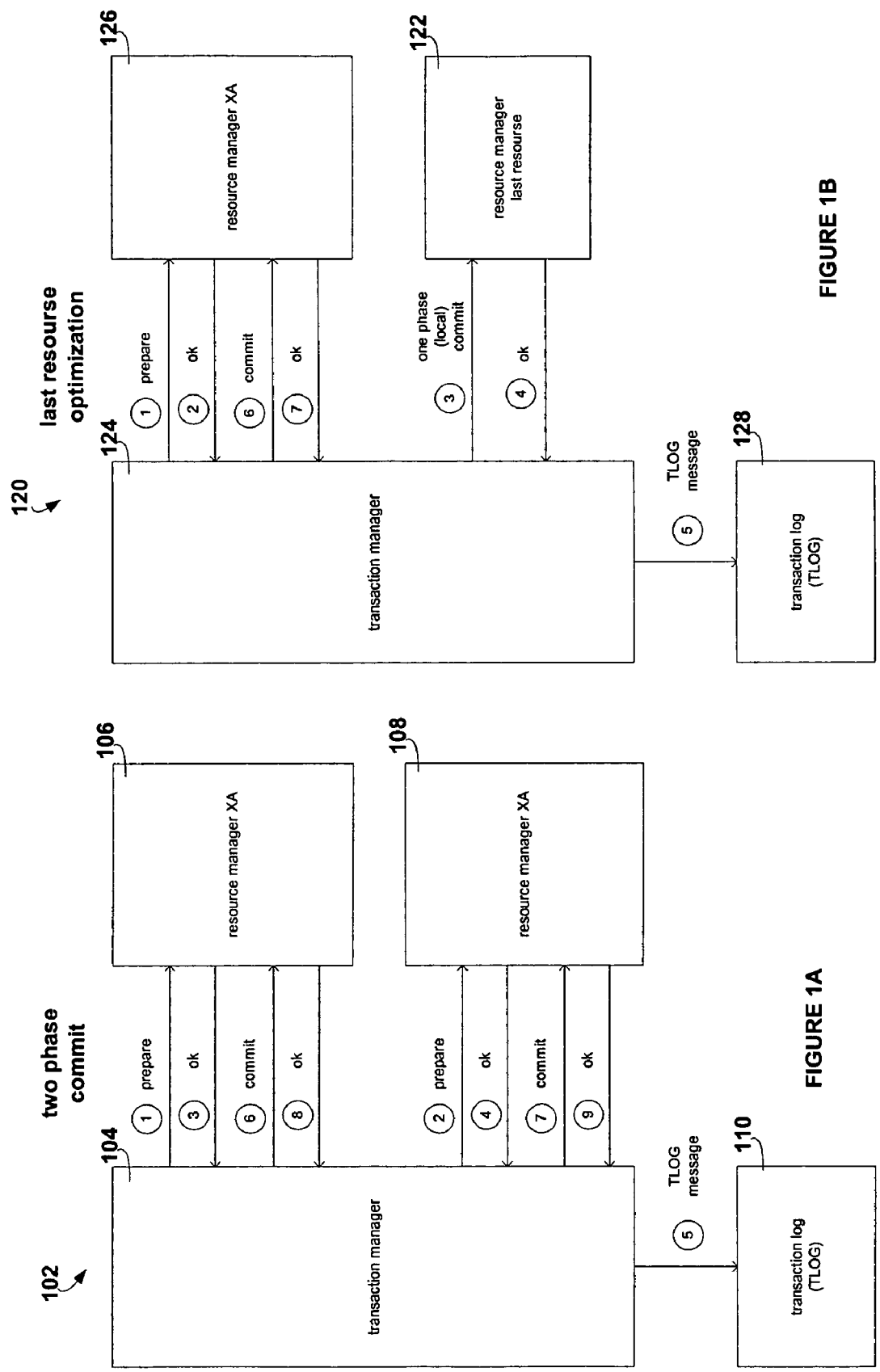
FIG. 1A illustrates a system in which each of the resource managers for a transaction are two-phase-commit resource managers.
FIG. 1B illustrates a transaction system using a last resource optimization.

FIG. 1A illustrates a two-phase-commit system 102. In this embodiment, the transaction manager 104 can send prepare instructions to the two-phase-commit resource managers 106 and 108. After both the two-phase-commit resource managers send their OK in steps 3 and 4, a transaction log 110 is stored by the transaction manager 104, in step 5. After the transaction log is stored, the transaction manager 104 instructs the resource managers 106 and 108 to commit, in steps 6 and 7. The resource managers send back their OK after the commit, in steps 8 and 9.

The two-phase-commit transaction system 102 is fully ACID. If the system crashes before the transaction log is stored, the transaction manager 104 rolls back the transaction. If the system crashes after the transaction log is written, the transaction manager 104 can then cause the resource managers 106 and 108 to commit.

It is sometime difficult to have an optimized or efficient resource manager for some resources. For example, databases often have inefficient resource managers. One attempt to avoid this problem is shown in the system of FIG. 1B. In the last resource optimization (LRO) system 120, one of the resource managers 122 does a single phase or local commit. In this example, the transaction manager 124 sends prepare signal instructions to each of the two-phase-commit resource managers, including the two-phase-commit resource manager 126. Once an OK is received from each of the two-phase-commit resource managers the transaction log 128 can be stored and a one-phase or local commit sent to the resource manager 122. Once the OK is received from the last resource 122 in a one-phase or local commit, the transaction manager 124 can cause each two-phase commit resource managers to do their commit. If the last resource manager 122 fails in the one-phase or local commit, there can be a heuristic failure that the transaction manager 124 does not know to fix.

The transaction manager 124 can wait until the OK is received from the resource manager of the last resource 122 before storing a transaction log. Even in this case, if both the resource manager 122 and transaction manager 124 go down after the resource manager 122 is able to commit, but before the transaction log 128 is able to be stored, then the transaction will be committed for the resource associated with the resource manager 122, but not for the resources associated with the two-phase-commit resource managers.

Figure 2:
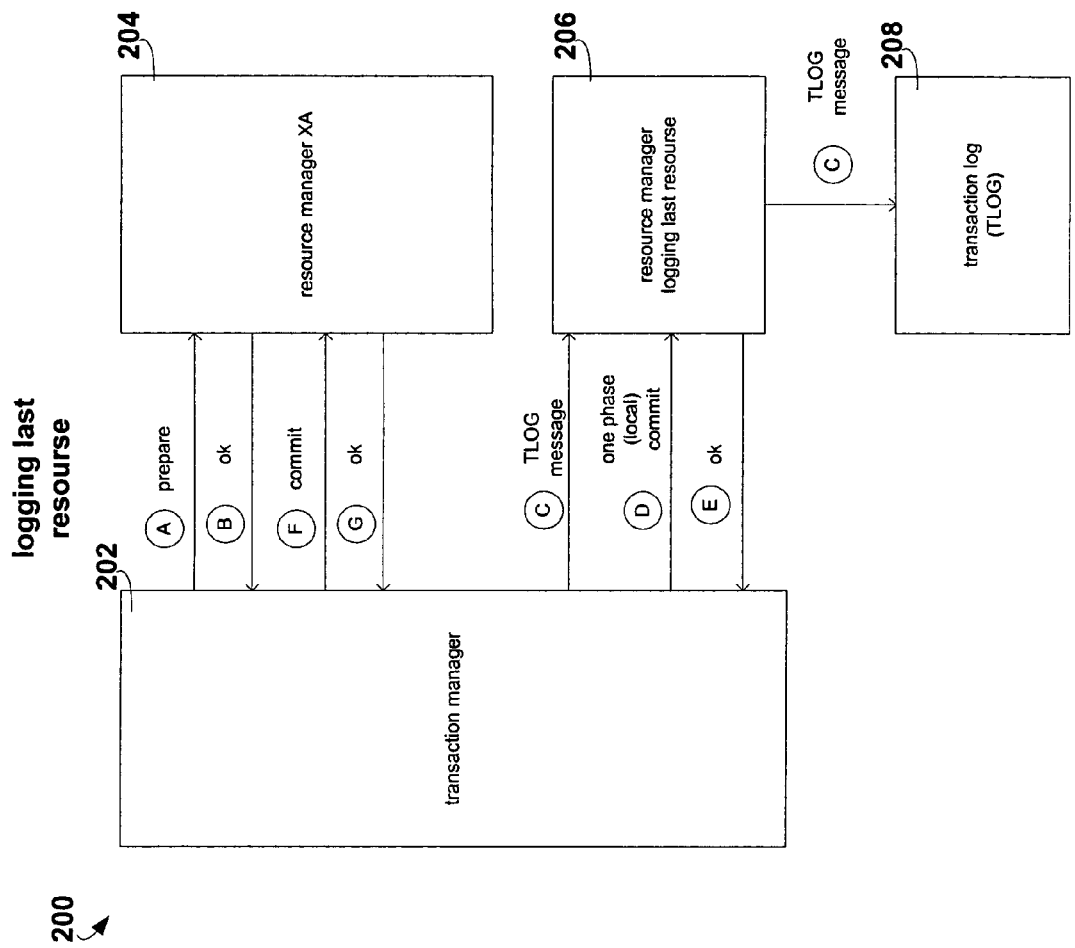
FIG. 2 illustrates a transaction system using a logging last resource.

FIG. 2 shows a logging last resource (LLR) system 200 for transactions. LLR system 200 includes a transaction manager 202. The transaction manager 202 can interact with a two-phase-commit resource manager 204 and a Logging Last Resource (LLR) resource manager 206.

The LLR resource manager 206 can use a single-phase or local commit and can store a transaction log 208 for the transaction manager 202. There can be multiple two-phase-commit resource managers used in a transaction, but, in one embodiment, only a single LLR resource manager is used.

In one embodiment, the LLR system 200 is fully ACID. The LLR resource manager 206 can store the transaction log (TLOG) 208 and do a one-phase or local commit in a single atomic operation. Either the transaction log 208 is stored and the resource manager 206 commits or the transaction log 208 is not stored and the LLR resource manager 206 does not commit. If the transaction log 208 is stored, that means that the transaction manager 202 can assume that the resource manager 206 has committed and can instruct the two-phase-commit resource managers, including the resource manager 204 to commit. If the transaction log 208 is not stored, this means that the resource manager 206 has not committed and the transaction managers knows that no resources have committed. The transaction manager 202 can then rollback the transaction and the transaction can be reattempted.

The LLR system 200 of one embodiment has the advantage that the LLR resource manager 206 can operate with a one-phase or local commit which can significantly improve the speed of the entire transaction. This increased speed does not result in additional heuristic failure risk because the LLR system 200 can be fully ACID.

In one embodiment, the LLR system 200 uses a significant fewer number of memory stores than the system shown in FIG. 1A. The transaction log and transaction data can be stored in a single write. The LLR resource manager 206 also does not use prepare writes. In one example, if the system of FIG. 1A requires five writes, the system of FIG. 2 only requires only three writes.

The resource of the LLR resource manager 206 can be a database, a messaging service, such as the Java Messaging Service, or any other type of resource. The LLR resource manager 206 can be part of or associated with the resource.

The LLR resource manager 206 can deal with the transaction log and transaction data in an atomic manner. For example, a database can store the transaction log and transaction data atomically, and a messaging service can store the transaction log and message transaction data atomically. The resource of the LLR resource manager 206 can operate in an atomic manner.

The LLR resource manager 206 can include a connection pool used to connect to the database. The connection pool can be on the same server as transaction manager. Having the connection pool on the same server as transaction manager helps maintain the atomicity of connection pools operation on the transaction log and the transaction data.

The connection pool can be a Java Database Connectivity (JDBC) connection pool for connecting to a database. A single connection of the connection pool can be used to store the transaction log and transaction data into the database. In one embodiment, the transaction manager can recover from crashes during the transaction.

One LLR implementation can work without a modification of the database or its client connection. The database resource manager code can be implemented in a "LLR connection pool" and wraps a standard JDBC connection. This LLR implementation supports ACID participation of databases even if the database doesn't implement the standard XA protocol since a "non-XA" JDBC connection can be used Furthermore, in this implementation, application programs commonly require no modification to switch from XA standard JDBC connections to LLR capable JDBC connections. Such a switch can be accomplished via a simple administrative change. Finally, in this implementation, applications can obtain LLR capable connections from one or more servers during a single transaction, and the implementation can transparently ensure that operations on these multiple connections all route to a single LLR capable connection reserved specifically for the transaction.

One method of the present invention includes instructing a two-phase-commit resource manager 204 to do a prepare phase of a transaction (step A of FIG. 1); receiving an OK from the two-phase commit resource manager 204 (step B); thereafter, instructing a logging last resource (LLR) resource manager 206 to do a local or one phase commit and store a transaction log (steps C and D); receiving an OK from the LLR resource manager (step E); and instructing the two-phase commit resource manager 204 to commit (step F).

The method can be done by transaction manager 202. The transaction log 208 can indicate that each of the two-phase commit resource managers has finished its prepare phase.

Figure 3:
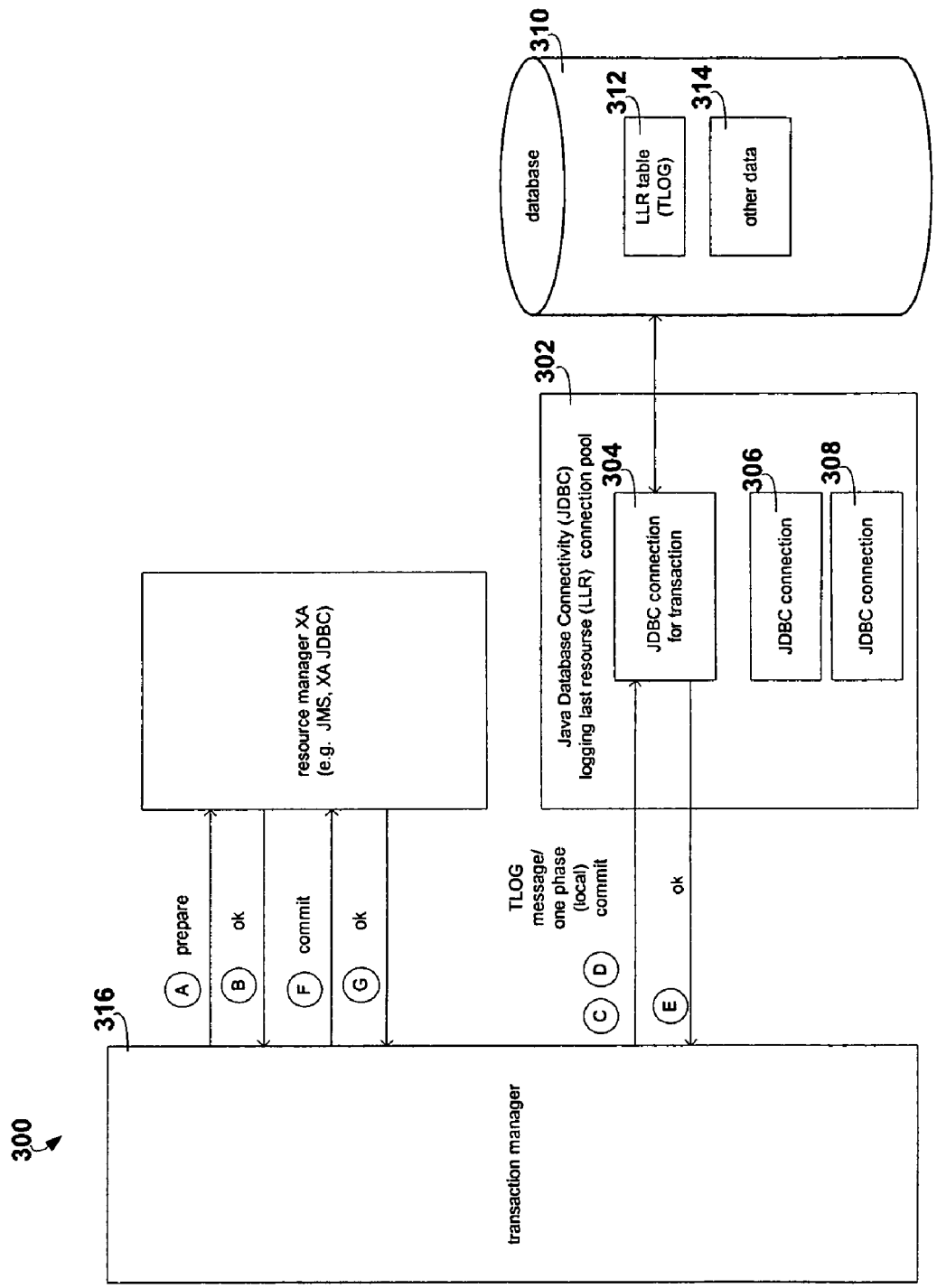
FIG. 3 illustrates an embodiment using a connection pool for the logging last resource.

Another embodiment of the present invention is a method. At a logging last resource (LLR) resource manager 206, a transaction log for a multiple resource transaction and a single-commit instruction is received. The transaction log is stored and the transaction committed in a local or single-phase commit FIG. 3 shows an embodiment of a system 300 of the present invention. A connection pool 302 can comprise a number of connections 304, 306, and 308. One of connections 304 is used to operate on a transaction log for a multiple resource transaction and on transaction data for the transaction. Transaction data can be saved in a local or single phase commit.

The connection pool 302 can connect to a database 310. The database 310 can store the transaction log and transaction data. In one embodiment, the transaction log can be stored in LLR table 312 and the transaction data can be stored in region 314. The database 310 can store the transaction log and transaction data in an atomic manner. The connection pool 302 can be on the same server as the transaction manager 316. The connection pool can be a Java Database Connectivity (JDBC) connection pool. The transaction manager 316 can use the stored transaction log to recover from a crash.

Appendix I describes a non-limiting example of a LLR transaction system. Appendix II describes a non-limiting example of a Java Database Connectivity (JDBC) logging last resource (LLR) connection pool. The discussion of the implementation of the LLR resource manager, connection pools and other elements described in the Appendixes are understood to concern one embodiment and are not meant or believed to have the effect of limiting the meaning of these terms and concepts. The Appendixes are provided to illustrate how these concepts can be implemented in one exemplary embodiment. Language such as "should", "must", and "will" in the Appendixes pertain to the exemplary embodiment and are not meant to limit the claimed concepts.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

APPENDIX I

Definition of Terms, Acronyms and Abbreviations

| Term | Definition |
| --- | --- |
| 1PC | Abbreviation for one-phase commit. |
| 2PC | Abbreviation for two-phase commit. |
| ACID | Common acronym for transaction properties: Atomic, Consistent, Isolated, and Durable. |
| C-LRO | See Connector Last Resource Optimization |
| Compensating Transactions | A method for avoiding 2PC by performing a transaction's component operations in multiple isolated transactions. The failure of an isolated transaction is handled at the application layer by additional "compensating transaction" code. |

-continued

Definition of Terms, Acronyms and Abbreviations

| Term | Definition |
| --- | --- |
| Distributed Transaction | Synonymous with global transaction. This term highlights the fact that global transactions often span multiple resource managers. See also two-phase commit. |
| Logging Last Resource | See Logging Last Resource Optimization |
| Global Transaction | A transaction that involves one or more XA resource managers, as opposed to a local transaction. See also one-phase commit and two-phase commit. |
| Heuristic Hazard/Failure | A transaction that fails to be atomic - a partially committed transaction. This term refers to a global transaction where the TM is unable to atomically force all involved RMs to either all rollback their work or all commit it. See also ACID. |
| JDBC Driver | Java Database Connector. Used to send SQL to a database, also serves to make sure that the SQL participates in the current transaction, by acting as a resource manager registered with the transaction manager. Part of the J2EE standard. |
| JMS | Java Messaging Service. Message queuing and publish/subscribe service. Most JMS implementation's operations can participate in global transactions by acting as a resource manager. Part of the J2EE standard [J2EE]. |
| JTA | Java Transaction API. Part of J2EE transaction standard [J2EE]. See also XAResource. |
| JTS | Java Transaction Service. An application server's implementation of JTA. |
| Local Transaction | A transaction that involves one resource, where the resource is not XA capable, as opposed to a global transaction. |
| One-Phase Commit | Abbreviated as 1PC. A global transaction that involves only one resource manager. In general, significantly more efficient than 2PC. |
| One-Phase Transaction | See one-phase commit. |
| Resource Manager | Abbreviated as RM. A resource that conforms to the XA standard such that operations on that resource can optionally participate in global transactions by registering with a transaction manager. |
| RM | Abbreviation for resource manager. |
| SQL | Structured Query Language. An industry standard way to define, update, and query a database. See also JDBC. |
| TM | Abbreviation for transaction manager. |
| TLOG | Abbreviation for transaction log. |
| Transaction | A set of operations on one or more resource managers that must either all succeed are all fail. See also ACID. |
| Transaction Log | A transaction manager's persistent state. A transaction manager uses its transaction log to persist a transaction record after the success of the first pass of a two-phase commit. This allows the transaction manager to recover transaction state after a crash, and successfully complete two-phase transactions. Abbreviated as TLOG. |
| Transaction Manager | Abbreviated as TM. A transaction manager coordinates, or drives, a global transaction. When a global transaction is committed or rolled back the transaction manager communicates this information to each of the resource managers that are involved in the transaction. |
| Transaction Monitor | Synonym for Transaction Manager. |
| Two-Phase Commit | Abbreviated as 2PC. In common usage, a synonym for two-phase global transaction. |
| Two-Phase Transaction | Abbreviated as 2PC. A global transaction becomes 2PC when operations involving two or more resource managers participate. In WebLogic, most 2PC transactions are due to transactions involving both a database operation and a message queuing (JMS) operation. 2PC transactions occur in two passes. A voting phase, in which each involved resource manager persists votes to complete the transaction, and a commit phase in which each resource manager completes its part of the transaction. See also 1PC. |
| XA | Historic abbreviation for "transactional". In the OpenGroup Distributed Transaction Processing Model, XA refers to the interface between the transaction manager and the resource manager. |
| XA Transaction | Synonymous with global transaction. |
| XAResource | JTA API for resource managers. The Java interface between TM and RM. See also RM and XA. |
| WLI | WebLogic Integrator. A BEA product layered on top of WebLogic JMS. |

Current WebLogic Transaction Support

WebLogic Transaction Architecture Overview

The WebLogic transaction architecture consists of a distributed service that runs one transaction manager instance per WebLogic server. A transaction may span multiple WebLogic servers, but any one transaction is "owned" by a particular transaction manager (TM), which is usually referred to as the coordinator of the transaction. Each coordinator maintains persistent state for two-phase transactions in its transaction log for crash recovery purposes.

One-Phase Transactions

A one-phase commit (1PC) transaction is a global transaction whose one or more operations all involve a single RM. For example, a transaction that has two JMS operations, a receive operation from a destination on a JMS server, and a send operation to a destination on the same JMS server, is 1PC. The steps for a one-phase transaction are:

(1) An application begins a new transaction.

(2) The application performs one or more operations that all refer to the same RM, the RM in turn registers its interest in the current transaction with the local TM.

(3) The application commits the transaction.

(4) The transaction manager (TM) recognizes that only one RM is involved and tells the single RM to commit the transaction. An optimized RM can usually perform all necessary persistent operation work in a single disk I/O.

Two-Phase Transactions

A two-phase commit (2PC) transaction is a transaction whose two or more operations all involve two or more RMs. For example, a transaction that has two operations, a receive operation from a destination on a JMS server, and a send operation to a destination on a different JMS server, is 2PC. The steps for a two-phase commit are:

(1) The application begins a new transaction.

(2) The application performs two or more operations that reference two or more different RMs, the RMs in turn register their interest in the current transaction with their local TM. The transaction subsystem chooses a single coordinating TM responsible for driving the transaction to completion.

(3) Application commits transaction.

(4) Prepare Phase: The coordinating TM tells each RM involved in the transaction to prepare their operational work for later commit. If any RM fails its prepare, the TM rolls back the transaction on all RMs, and the application commit throws an exception. Each RM prepare must persist sufficient information about the application's operations so that the RM can successfully drive the RM's part of the transaction to completion even if the RM crashes and reboots. As an optimization to reduce latency, the coordinator calls prepare on all RMs in parallel.

(5) TLOG write: Once the prepare phase completes with no errors, the TM writes to its TLOG to persistently record the transaction ID, and the identities of the involved RMs. This allows the coordinating TM to drive the transaction to completion after a crash of the TM or a crash of one of the involved RMs during the "commit phase".

(6) Commit Phase: Once the TLOG write is recorded to disk, the coordinating TM tells each RM involved in the transaction to commit their operational work. Each RM must in turn typically perform a disk I/O to persistently record the operation's success, and must also make the results of the operation visible to applications that perform subsequent operations on the RM. As an optimization to reduce latency, the coordinator calls commit on all RMs in parallel.

Comparing 1PC, 2PC, and Local Transaction Performance

For global transactions, 1PC is much faster than 2PC for a variety of reasons:

The TM does no TLOG disk I/O (2PC requires a TLOG disk write).

The RM can efficiently aggregate all transaction work into a single disk I/O. 2PC requires each involved RM to perform 2 I/Os (one for prepare, one for commit).

Ideally, a given resource manager's overhead for a 2PC transaction is twice that of a 1PC transaction, but this is not always the case. Some RMs don't efficiently implement 2PC.

2PC transactions have triple the latency of 1PC. A 2PC transaction's phases necessarily run three I/Os in sequence, one for prepare, one for the coordinator's TLOG write, and one for commit. The latency of the prepare and commit phases is determined by the latency of the slowest involved RM, as RM commits and prepares occur in parallel.

Local and 1PC transactions each involve a single resource, have the same ACID characteristics, and ideally should have about the same performance. But 1PC, like 2PC, requires that participating resources support XA, and the different code path incurs a performance penalty on some resources.

Note that for applications in which many transactions occur in parallel, overall throughput performance of 2PC and 1PC may be relatively similar, provided all involved RMs are efficient at the XA protocol and are efficient at aggregating simultaneous disk I/Os, and provided that all involved servers have sufficient threads to handle increased thread blocking. In this case, individual 2PC transactions will exhibit roughly triple the latency of 1PC but overall transactions per second can be similar.

Current WebLogic 2PC Optimizations

WebLogic server currently supports two optimizations that reduce the overhead of 2PC, "XA Emulation" and "Last Resource Optimization" Both optimizations work by driving at least one of a transaction's RMs 1PC rather than 2PC. Both also have a major drawback in that they increase the risk of heuristic hazards. Specifically, a heuristic hazard occurs when an RM participating in a global transaction cannot recover or complete its part of a transaction after a crash or internal failure.

The chance of a particular transaction getting a heuristic hazard due to a crash is relatively small. But, since most application servers handle many transactions concurrently, the odds that at least one transaction gets a heuristic hazard due to a crash increase considerably:

$$1-(1-(\text{chance of heuristic hazard for one tx}))^{(concurrent\ tx\ count)}$$

The following sections describe 2PC optimization options as they are available now, and where and how heuristic hazards may occur.

XA Emulation (EnableTwoPhaseCommit='true')

XA emulation is a configurable option for JDBC drivers that do not support the XA RM interfaces. XA emulation is exposed via a flag on a WebLogic JDBCTxDataSource (EnableTwoPhaseCommit). If the underlying JDBC driver is XA capable, this option is ignored in favor of (slower but safer) 2PC.

For 1PC transactions, XA emulation works atomically and is truly ACID, but for 2PC, the JDBC driver emulates XA capability by always returning success during prepare without doing any other work. The transaction control of flow is the same as normal 2PC except that one or more of the involved JDBC resource managers is not "truly" 2PC capable. Normally, an RM must persist transaction data during the 2PC prepare phase to enable transaction recovery in the event of a crash or internal failure. The net effect of the optimization is that the database acts on the transaction locally, which improves performance, but there is a greater possibility of heuristic hazards. The following example illustrates the algorithm for a two RM transaction, as well as where the possibility of heuristic hazards is introduced:

(1) An application begins a new transaction.

(2) The application performs operations that refer to two RMs:
RM-emulate: JDBC driver with XA Emulate enabled
RM-XA: True XA RM, (such as WL-JMS)

(3) The application commits its transaction.

(4) Prepare Phase: In parallel, the coordinating TM tells each of RM-XA and RM-emulate to prepare their operational work for later commit. RM-XA in turn persists operational state for crash recovery purposes and returns "true", RM-emulate simply returns "true" without doing any other work. In the event of a failure during the prepare phase, the TM tells each RM to rollback, which will safely rollback all operational work, including work associated with RM-emulate.

(5) TLOG write: Once the prepare phase completes with no errors, the TM writes to its TLOG to persistently record the transaction ID, and the identities of the involved RMs. This allows the coordinating TM to drive the transaction to completion after a crash of the TM or one of the involved RMs during the "commit phase".

Heuristic Hazard A: If either the WL server hosting the RM-emulate JDBC driver, or the database crashes during TLOG write and before the following commit phase can start, a "heuristic hazard" results. The transaction manager eventually detects the hazard and logs it. In this case it is likely that the RM-emulate will eventually roll back but RM-XA will commit, leading to a true partial commit hazard.

(6) Commit Phase: Once the TLOG write is recorded to disk, the coordinating TM tells each RM to commit their operational work in parallel. Each RM must in turn typically perform a disk I/O to persistently record the operation's success, and also make the results of the operation visible to applications that perform subsequent operations on the RM. As an optimization to reduce latency, the coordinator calls commit on all RMs in parallel. During commit, RM-emulate performs a local transaction.

Heuristic Hazard B: If the WL server hosting the RM-emulate JDBC driver, or the database crashes before the commit phase can complete a "heuristic hazard" results. The transaction manager detects the hazard and logs it. In this case it is ambiguous whether or not the RM-emulate commit actually succeeded, which may mean that even though the a hazard was logged, the transaction may have been fully successful.

Heuristic Hazard C: A heuristic hazard is also possible without a crash when the RM cannot complete the local commit. For example, the RM had to break a deadlock, internal error, etc.

WebLogic Connector Last-Resource Optimization (C-LRO)

Prior to WebLogic 8.1, WebLogic Connectors that did not support 2PC transactions automatically used "XA Emulation". In 8.1, such connectors use a "connector last-resource commit optimization" (abbreviate C-LRO) rather than XA emulation.

Note: WLS JDBC and JMS do not use WebLogic connectors, so C-LRO is not directly available to them, unless application code is written to wrap the JDBC or JMS calls inside a connector.

The following excerpt from the WebLogic server documentation summarizes C-LRO Normally, for a client to perform operations on multiple resource adapter connections to participate in a global/XA transaction, the resource adapters involved are required to support XATransaction. However, resource adapters that only support Local Transactions may also be involved in a global/XA transaction, but in a limited manner, because they do not receive two-phase commit messages from the transaction manager.

In WebLogic Server 8.1, if the server detects a Local Transaction capable resource adapter connection in a global transaction, the transaction manager first issues prepare messages to the XAResources involved in the transaction. Then, after all XAResources have prepared successfully, the operation on the Local Transaction capable resource adapter is performed. If the operation is successful, the global transaction is committed. If the operation fails, then the global transaction is rolled back. This prevents the possibility of the Local Transaction resource adapter's commit failing after a XA resource has already been committed.

The following example illustrates C-LRO for a two RM transaction, as well as where the possibility of heuristic hazards is introduced:

(1) An application begins a new global transaction.

(2) The application performs operations that refer to two RMs:
RM-C-LRO: Connector incapable of 2PC
RM-XA: True XA RM, (such as WL-JMS)

(3) The application commits its transaction.

(4) Prepare Phase: The coordinating TM tells RM-XA to prepare its operational work for later commit. RM-XA in turn persists operational state for crash recovery purposes and returns "true". Using a proprietary protocol, the TM detects that RM-C-LRO is not 2PC capable, and chooses to drive the remainder of the transaction using the C-LRO algorithm—the TM consequently does not call prepare on RM-C-LRO. In the event of a failure during the prepare phase, the TM tells each RM to rollback, which will safely rollback all operational work, including work associated with RM-C-LRO.

(5) C-LRO Local Commit Phase: The coordinating TM tells RM-C-LRO to one-phase commit—which tells RM-C-LRO to complete their transaction work (usually via a local transaction). On any type of failure, there is a "presumed rollback" and the TM silently rolls back the transaction. Heuristic Hazard A: The following conditions would cause a heuristic hazard, where the TM gets a failure and rolls back RM-XA's part of the transaction even though RM-C-LRO committed its part of the transaction. These failures go undetected and unlogged by the TM:

The resource that the connector "wraps" completes successfully, but crashes before it can return a success to the connector.

The resource that the connector "wraps" completes successfully, but the WL server hosting the connector crashes before it returns a success back to the TM.

The resource that the connector "wraps" completes successfully, but a network failure prevents the success from passing back through the connector to the TM.

The TM crashes anytime after it has submitted the commit request to WL-C-LRO but before it can complete the next step.

(5) TLOG write: Once the prepare and local commit phases complete with no errors, the TM writes to its TLOG to persistently record the transaction ID, and RM-XA's involvement. This allows the coordinating TM to drive RM-XA's part of the transaction to completion after a crash of the TM, or after a crash of RM-XA during the following "commit phase".

Heuristic Hazard B: If the TM crashes before it can complete its TLOG write, a heuristic hazard results where RM-C-LRO has committed its part of the transaction but RM-XA will eventually rollback its part of the transaction. As with heuristic hazard A, the transaction manager does not detect the heuristic hazard, and consequently does not log it.

(6) Commit Phase: Once the TLOG write is recorded to disk, the coordinating TM tells RM-XA to commit its operational work. RM-XA must in turn typically perform a disk I/O to persistently record the operation's success, and also make the results of the operation visible to applications that perform subsequent operations.

Comparing C-LRO to XA Emulation

Evaluating C-LRO algorithm versus the XA emulation algorithm:

Both have similar throughput performance.
Both increase the possibility of heuristic hazards.
C-LRO has greater latency (4 steps instead of 3).
C-LRO heuristic hazards occur silently without the TM detecting and logging them
C-LRO heuristic hazards predictably occur where the C-LRO RM commits but the XA RM(s) roll back, and not vice-versa. XA emulation heuristic hazards may involve any resource committing and the other rolling back.
Digression: The latter predictable behavior of C-LRO can be taken advantage of by some applications. For example, consider a message-driven application that inserts a table row for each new message, where a non-XA capable connector is used to perform the table insert. If the application receives a message, and has a way to easily to detect if the related insert has already occurred, it can detect if a heuristic hazard occurred, that the required work has already been performed, and that the message can be safely deleted without doing the insert again. (On further thought, one wonders why an application would use a global transaction if duplicate messages are easily detected and handled—why not use two local transactions instead?)

Future Options

Logging Last Resource

Logging Last Resource (LLR) is a safe optimization that does not increase the risk of heuristic hazards. In addition, it performs the same as, if not better than either.

In a LLR transaction, one of the involved RMs must be "TLOG capable", and that same RM is then driven 1PC (or locally) rather than 2PC. In addition, the TLOG write that normally would be written to disk in 2PC is instead written to the TLOG-capable-RM as part of the 1PC (or local) transaction.

Since 2PC introduces a heavy cost with certain databases, this TLOG capable RM would typically be a database so that the database could be driven 1PC.

The following example illustrates LLR for a two RM transaction:

(1) An application begins a new transaction.

(2) The application performs an operation refers to two RMs:
RM-LLR: RM capable of storing TLOG records
RM-XA: True XA RM, (such as WL-JMS)

(3) The application commits its transaction.

(4) Prepare Phase: The coordinating TM tells RM-XA to prepare its operational work for later commit. RM-XA in turn persists operational state for crash recovery purposes and returns "true". Using a proprietary protocol, the TM detects that RM-LLR is TLOG-capable, and chooses to drive the remainder of the transaction using the LRO algorithm—the TM consequently does not call prepare on RM-LLR. In the event of a failure during the prepare phase, the TM tells each RM to rollback, which will safely rollback all operational work, including work associated with RM-LLR.

(5) LLR Local Commit and TLOG Write Phase: The coordinating TM writes a TLOG record using RM-LLR (presumably to a designated transaction table), then tells RM-LLR to one-phase (or locally) commit—which completes RM-C-LROs transaction work. If RM-LLR returns false then the transaction is rolled back, if the RM-LLR throws an ambiguous error then the TM must attempt to resolve whether or not the local transaction succeeded (see disadvantages below).

(6) Commit Phase: Once the TLOG write/local commit succeeds, the coordinator TM tells RM-XA to commit its operational work. The RM-XA must in turn typically perform a disk I/O to persistently record the operation's success, and also make the results of the operation visible to applications that perform subsequent operations on the RM.

Advantages:

Reduces the overall number of disk writes. For example, for a typical two-phase two RM transaction, there are 5 disk writes. One by each RM during prepare, one by the TM to write a TLOG record, and one by each RM during commit. A LLR brings the number of disk writes down to 3. There is one during prepare, one during the local commit/log phase, and one during commit. (An optimized RM can often aggregate the persistent work for related concurrent operations into one disk write. This is why the commit/log phase is counted as one disk write.)

The database does not need to run in XA mode.

Works for all combinations of RMs where at least one RM is "TLOG capable", helps even if JMS is not involved. If the WLS JMS RM were made "TLOG capable", LLR would even aid performance when transactionally forwarding messages between MQSeries JMS and WLS JMS.

The TLOG is stored centrally in the same place as RM data. This simplifies data management, and also simplifies WL server fail-over. For example, a "TLOG capable" database would allow TLOG records to be stored centrally in the database rather than to the local disk.

Does not increase the risk of heuristic hazards (unlike Emulated XA or C-LRO).

Reduces contention on locked database rows (due to elimination of the database prepare and commit phase which are separated in time by a TLOG write).

APPENDIX II

Introduction

Purpose

Two-phase transactions are currently a significant performance bottleneck for WLS applications and WLS layered products. A transaction becomes two-phase commit (2PC) when operations involving two or more resources participate. In practice, most 2PC WLS transactions are two-phase because they involve both a database operation (using JDBC) and a message queuing operation (using JMS). Two-phase transactions that involve database resources introduce a particularly significant bottleneck not only because 2PC transactions involve more steps by definition, but also because some databases or database drivers tend to implement the 2PC XA protocol inefficiently.

JDBC LLR connection pools safely improve two-phase transaction performance for transactions that include database operations. In current major application servers, fully ACID global transactions normally require that each participating resource be an XA resource manager. The logging last resource (LLR) algorithm relaxes this requirement to allow a single non-XA LLR capable resource to participate in a global transaction, while still preserving full ACID properties.

For a more comprehensive discussion of the XA protocol, current WebLogic transaction optimization options, the LLR algorithm, and additional WebLogic transaction optimization options, refer to [APPENDIX I].

Scope

This functional specification describes a new feature for WebLogic Server: LLR enabled WebLogic JDBC JTS connection pools. This feature addresses a primary XA performance bottleneck (database participation), and eliminates the requirement that JDBC applications use XA capable drivers in order to get fully ACID transactional integrity in two-phase transactions. Currently the LLR algorithm is limited to JTS JDBC drivers. In the future, the LLR algorithm may be made available to other resource managers (RMs), such as J2EE Connectors, JMS resources, WebLogic Store resources, etc., as well as JDBC XA connection pools. This functional specification is not intended to discuss the rationale of choosing the LLR algorithm over the other approaches discussed in [APPENDIX I].

| Definition of Terms, Acronyms and Abbreviations | |
|---|---|
| Term | Definition |
| 1PC | Abbreviation for one-phase commit. |
| 2PC | Abbreviation for two-phase commit. |
| ACID | Common acronym for transaction properties: Atomic, Consistent, Isolated, and Durable. |
| LRO | See Connector Last Resource Optimization in [APPENDIX I]. |
| Distributed Transaction | Synonymous with global transaction. This term highlights the fact that global transactions often span multiple resource managers. See also two-phase commit. |
| LLR | See Logging Last Resource Optimization in [APPENDIX I]. |
| Global Transaction | A transaction in which one or more XA resource managers and at most one LLR resource manager participate, as opposed to a local transaction. See also one-phase commit and two-phase commit. |
| Heuristic Hazard/Failure | A transaction that fails to be atomic - a partially committed transaction. This term refers to a global transaction where the TM is unable to atomically force all involved RMs to either all rollback their work or all commit it. See also ACID. |
| JDBC Driver | Java Database Connector. Used to send SQL to a database, also serves to make sure that the SQL participates in the current transaction, by acting as a resource manager registered with the transaction manager. Part of the J2EE standard [J2EE]. |
| JMS | Java Messaging Service. Message queuing and publish/subscribe service. Most JMS implementation's operations can participate in global transactions by acting as a resource manager. Part of the J2EE standard [J2EE]. |
| JTA | Java Transaction API. See also XAResource. Part of J2EE transaction standard [J2EE]. |
| JTS | Java Transaction Service. An application server's implementation of JTA. |
| Local Transaction | A transaction that involves one resource, where the resource is not XA capable, as opposed to a global transaction. |
| One-Phase Commit | Abbreviated as 1PC. A global transaction that involves only one resource manager. In general, significantly more efficient than 2PC. |
| One-Phase Transaction | See one-phase commit. |
| Resource Manager | Abbreviated as RM. A resource that conforms to the XA standard such that operations on that resource can optionally participate in global transactions by registering with a transaction manager. |
| RM | Abbreviation for resource manager. |
| SQL | Structured Query Language. An industry standard way to define, update, and query a database. See also JDBC. |
| SPECjAppServer2004 | Soon-to-be-public standard benchmark for measuring the performance of J2EE application servers. http://www.spec.org/ |
| TM | Abbreviation for transaction manager. |
| TLOG | Abbreviation for transaction log. |
| Transaction | A set of operations on one or more resource managers that must either all succeed are all fail. See also ACID. |
| Transaction Log | A transaction manager's persistent state. A transaction manager uses its transaction log to persist a transaction record after the success of the first pass of a two-phase commit. This allows the transaction manager to recover transaction state after a crash, and successfully complete two-phase transactions. Abbreviated as TLOG. |

-continued

| Definition of Terms, Acronyms and Abbreviations | |
|---|---|
| Term | Definition |
| Transaction Manager | Abbreviated as TM. A transaction manager coordinates, or drives, a global transaction. When a global transaction is committed or rolled back the transaction manager communicates this information to each of the resource managers that are involved in the transaction. |
| Transaction Monitor | Synonym for Transaction Manager. |
| Two-Phase Commit | Abbreviated as 2PC. In common usage, a synonym for two-phase global transaction. |
| Two-Phase Transaction | Abbreviated as 2PC. A global transaction becomes 2PC when operations involving two or more resource managers participate. In WebLogic, most 2PC transactions are due to transactions involving both a database operation and a message queuing (JMS) operation. 2PC transactions occur in two passes. A voting phase, in which each involved resource manager persists votes to complete the transaction, and a commit phase in which each resource manager completes its part of the transaction. See also 1PC. |
| XA | Historic abbreviation for "transactional". In the OpenGroup Distributed Transaction Processing Model, XA refers to the interface between the transaction manager and the resource manager. |
| XA Transaction | Synonymous with global transaction. |
| XAResource | JTA API for resource managers. The Java interface between TM and RM. See also RM and XA. |
| WLI | WebLogic Integrator. A BEA product layered on top of WebLogic JMS. |
| WLS | WebLogic Server. |

LLR Enabled JDBC Connection Pools

Functional Description

As described in [APPENDIX I], LLR multi-resource transactions are fully ACID, yet allow one participating resource (the LLR resource) to perform its operations in a single local transaction rather than in the standard two phases normally required by XA (prepare and commit). As part of its local transaction, the LLR resource additionally assumes responsibility for persisting the transaction log record. Standard XA 2PC transactions require that all resources perform discrete "enlist", "prepare", and "commit" steps, and also require that the transaction manager persist a transaction log record after the prepare phase but before the commit phase.

LLR transactions improve performance over full XA transactions because an LLR transaction has fewer synchronous disk I/Os (the transaction log write is combined with the LLR commit write, and there is no prepare phase for the LLR resource—only a commit), and because the LLR resource performs no enlist steps (which can be very CPU intensive with some database drivers). In detail, a JDBC LLR connection pool participates in a transaction in this manner: Under a particular transaction, the first connection obtained from the pool reserves an internal JDBC connection that is dedicated to the transaction. The internal JDBC connection is reserved on the specific server that is also the transactions' coordinator (for details on optimizing coordinator choice, see appendix Error! Reference source not found.). All subsequent transaction operations on any connections obtained from the pool on any server are routed to this same single internal JDBC connection.

When an LLR transaction is committed, the LLR algorithm transparently activates. From an application perspective, the transaction semantics remain the same, but from an internal perspective, the transaction is handled differently than standard XA transactions. Internally, first all participating non-LLR XA resources must successfully complete their 2PC prepare phase (otherwise the transaction rolls back), second, if there are participating non-LLR XA resources (eg. the transaction is 2PC), the internal JDBC connection is used to store the transaction's log record in a special "LLR" table on the database, third, the database operations on the internal JDBC connection are committed using a local transaction, fourth, the operations on the non-LLR XA resources are committed via the 2PC commit phase, and finally, the database transaction log entry is lazily deleted as part of a future transaction.

If a transaction's coordinator server crashes before an LLR resource stores its transaction log record or before an LLR resource commits, the transaction rolls back. If the server crashes after the LLR resource is committed, the transaction will eventually fully commit—as during reboot the transaction coordinator will use the LLR resource to read the transaction log record from the database and then use the recovered information to commit any unfinished work on any participating non-LLR XA resources.

Functional Requirements 1.1.1 LLR Restrictions

From an application perspective, JDBC LLR connection pools behave similarly to JTBC JTS connection pools that have "EnableTwoPhaseCommit" configured to true. Here are the restrictions on LLR connection usage:

1. JDBC LLR connection operations participate in a user transaction if and only if the connection is obtained after a transaction begins on the thread.
2. For a particular transaction, the LLR algorithm routes operations from all JDBC connections obtained from same-named LLR pools to a single underlying connection from a same-named connection pool running on the transaction's coordinator. The routing uses WebLogic's standard JDBC RMI Driver, which is also used to supply remote access to JTS, Pool, and XA JDBC drivers. The following restrictions result:
   a. A JDBC LLR connection can't participate in a transaction unless it is obtained from a connection pool with the same name as a connection pool on the transaction's coordinator server. A call to javax.sql.DataSource.get-Connection( ) on a JDBC LLR pool throws a java. sql.SQLException if there is no same-named JDBC LLR connection on the coordinator server.

b. This routing impacts performance for two reasons: one, it introduces an extra-hop from a remote server to the coordinator for JDBC operations, so that for "large" operation using JDBC LLR pools may not perform as well as JDBC XA pools which can normally be used to obtain a local connection (no extra-hop is introduced for clients, which get a direct RMI reference to the remote pool), and two, references to non-serializable objects within JDBC ResultSets result in remote calls (specifically, BLOBs and CLOBs).

c. This routing limits the number of concurrent transactions. The maximum number of concurrent LLR transactions equal to the size of the coordinator's JDBC LLR connection pool.

d. Routed connections have less capability than local connections, and may fail as a result. Specifically, non-serializable "custom" data types within a query ResultSet may fail.

Fortunately, the majority of applications obtain connections from the same server that is their transaction coordinator—which eliminates routing. For notes on how the transaction coordinator is chosen, see appendix Error! Reference source not found.

3. A transaction's designated JDBC LLR connection can only participate in a single transaction at a time, and is not returned to its pool until the transaction commits or rolls back.

4. JDBC LLR pools don't support JDBC XA drivers. If the JDBC driver supports XA, a warning message is logged, and the connection pool participates in transactions as a full XA resource rather than as an LLR resource.

5. Two differently named JDBC LLR connection pools cannot participate in the same transaction. A call to javax.sql.DataSource.getConnection( ) on a JDBC LLR pool throws a java.sql.SQLException if there is already a differently named JDBC LLR connection pool participating in the transaction.

6. An LRO enabled (NonXAResource) J2EE Connector cannot participate in a transaction in which an LLR resource also participates. There is a conflict: both LRO and LLR require that their respective resources be the last resource in the transaction. For more information on LRO connectors see [APPENDIX I]. The transaction commit ( ) method throws a javax.transaction.RollbackException this conflict is detected.

7. If a JDBC LLR transaction is 2PC, and the transaction data is too large to fit in the LLR table, the transaction will fail with a rollback exception thrown during commit. It is possible for database administrators to manually create a table with larger columns if this occurs.

8. If the transaction's coordinator is a foreign superior transaction manager (typically a non-WebLogic TM), the transaction will fail. LLR Database Tables Table Creation and Naming Each WebLogic server maintains a database "LLR" table per JDBC LLR connection pool. These tables are used for storing transaction log records, and are automatically created. If multiple LLR connection pools share the same WebLogic server, database instance, and database schema, they will also share the same LLR table.

LLR table names are automatically generated unless administrators choose to configure them.

Table Format

The LLR table has three columns:

| XIDSTR | VARCHAR (40) | PRIMARY KEY |
|---|---|---|
| POOLNAMESTR | VARCHAR (64) | |
| RECORDSTR | VARCHAR (1000) | |

Binary data is stored as base64 encoded text in the RECORDSTR column. Benchmarks show that this incurs little or no measurable overhead, and some users have stated a preference for text as binary column configuration differs between database vendors.

Table Transaction Log Records

Each committed LLR transaction automatically inserts a transaction record into an LLR database table. Once LLR transactions complete, their transaction records are lazily deleted.

Internal use only: LLR transaction record deletes occur up to 5 at a time with the local transaction used to commit later LLR transactions. If more than a 5 seconds of idle time passes without a committed transaction, transaction records for completed transactions are immediately deleted using a newly obtained JDBC connection. The maximum number of deletes per local transaction is configurable via an undocumented setting.

Connection Failure

In one embodiment, a failure of the LLR JDBC connection during transaction record insert results in a transaction rollback.

A failure of the LLR JDBC connection during its local commit can log an error message and throws a javax.transaction.SystemException back to the user. In the case of a 1PC transaction (a transaction that only involves the LLR resource), the transaction will either (A) be fully committed, (B) be fully rolled back, or (C) be blocked awaiting resolution of the database local transaction. In all. Cases (A, B, or C), the outcome of the transaction is unknown, but the transaction is still fully ACID (it will eventually be either fully rolled back or fully committed). In the case of a 2PC transaction, the TM will periodically test to see if the LLR resource part of the transaction rolled back or committed. When this can be determined, the remaining prepared resources in the transaction are automatically committed or rolled back as appropriated.

If an LLR table transaction log record delete fails, the server will log a warning message and retry the delete again later.

WebLogic Server Boot Recovery of LLR Transaction Tables

During boot, each WebLogic server must recover transaction records from its LLR log tables. Consequently, each server will attempt to read the database LLR tables of each LLR connection pool. This attempt occurs after the boot's deployment phase, but before the server's ports are opened.

The server will allow up to 2 minutes to read in each LLR backing table. The 2 minute timeout is not configurable. On failure or timeout, the boot will fail and mark the server with a bad health state: HealthState.HEALTH_FAILED.

If a timeout occurs, it will likely be due to unresolved local transactions that have locked rows within the LLR log tables. Such local transactions must be resolved so that the transaction manager can exactly determine the state of the global transaction whose record is stored in the locked row. Local database transactions can only be diagnosed and resolved using each database's specific tools (the commands differ from database to database).

Interface Requirements

Configuration Requirements

The paramount LLR configuration requirements are: one, JDBC LLR pools must be available during boot in order to recover their transaction log records (they can't be deployed after boot), and, two, it must be hard to delete a JDBC LLR pool from a server if there are outstanding transactions in its LLR database table.

Management Interface, Designating LLR Capable Pools

JDBC LLR Connection Pools are configured by setting the

```
<jdbc-data-source>
    <jdbc-data-source-params>
        <global-transactions-protocol>
``` field to the value LoggingLastResource in a globally scoped (not application scoped) JDBC deployment. Setting this value on an application scoped deployment causes the deployment to fail. (In diablo (9.0), all JDBC pools are configured using deployment descriptors.)

Changing a pool's global transactions protocol is not dynamic, so changes on a running WL server don't take affect until the next time the WL server boots.

Management Interface, Setting the JDBC LLR Table Name

LLR tables are named WL_LLR_<DOMAINNAME>_<SERVERNAME> by default. Optionally, per WL server, an arbitrary LLR table name can be configured in the format "[[[catalog.]schema.]name". Each "." in the format is significant, and schema generally corresponds to username in many databases. The LLR table name is configured on the weblogic.management.configuration.ServerMBean class with:

public String getJDBCLLRTableName( )

public void setJDBCLLRTableName (String name)

This setting is not dynamic, so changes on a running WL server don't take affect until the next time the WL server boots.

If the table name exceeds the database's maximum table name length, the LLR connection pool(s) will fail to deploy and a log message will be generated.

NOTE: If the table name changed, but the table already exists in the database, the existing database table must be renamed by a database administrator so that the database table name corresponds to the configured table name. Otherwise, transaction records may get lost, resulting in heuristic failures that aren't logged.

NOTE: Multiple servers must not share the same table, but multiple connection pools within the same server may share the same table. If multiple same named servers share a table, the behavior is undefined, but it is likely that transactions will not recover properly after a crash, creating heuristic hazards that are not logged. If multiple differently named servers attempt to share a table, all but one of the servers will fail to boot. (The server that creates the table reserves the table for its exclusive use by permanently inserting its server-name and domain-name directly into the table, and all servers check to make sure that their server-name and domain-name match what is in the table.)

NOTE: Arbitrarily deleting rows from this table is dangerous, as this can result in silent heuristic hazards that will go undetected (and unlogged) by the transaction manager.

Management Interface, LLR Table Fine Tuning

The maximum number of row deletes per local transaction (default 5) is configurable via an undocumented property setting. The setting is tunable on a per server basis via the property:

-Dweblogic.llr.jts.deleteinterval=5

Management, Supported Databases

JDBC LLR Connection pools are supported on DB2, Informix, SQL Server, Sybase, Oracle, MySQL, and PointBase. The following JDBC drivers are supported: DataDirect's Oracle, SQL Server, Sybase, Informix, DB2 drivers, Oracle's thin driver, MySQL drivers, and Pointbase drivers.

Console Screens

Unless designated undocumented, the LLR settings above will be available on the WL console, the WL configuration wizard, and in WL Workshop if appropriate.

Transaction Management

LLR transactions are manageable using the same interfaces and console screens as non-LLR transactions. This includes the ability to view such transactions, as well as force them to roll back.

What is claimed is:

1. A system for processing transactions across a plurality of resources, comprising:
a computer, including a transaction manager for executing thereon, for use in processing transactions across a plurality of resource;
a plurality of resource managers, including a resource manager associated with each resource that will participate in a transaction, wherein the plurality of resource managers further includes
a logging last resource (LLR) resource manager, that is capable of performing local commit with its associated resource as part of the transaction, and
one or more resource managers, distinct from the LLR resource manager, each of which are capable of performing a two-phase commit with their associated resource as part of the transaction; and
wherein to process the transaction, the transaction manager
determines which of the plurality of resource managers is the LLR resource manager
sends a prepare command, as part of a two-phase commit process, to each of the one or more resource managers, distinct from the LLR resource manager,
upon receiving a confirmation, from each of the one or more resource managers, distinct from the LLR resource manager, that the prepare commands have succeeded,
provides transaction log information to the LLR resource manager, and
instructs the LLR resource manager to write the transaction log information to persistent storage and atomically therewith locally commit the transaction at its associated resource, and
upon receiving a confirmation, from the LLR resource manager, that the local commit has succeeded, sends a commit command, as part of the two-phase commit process, to each of the one or more resource managers, distinct from the LLR resource manager, to commit the transaction at their associated resources.

2. The transaction system of claim 1, wherein the resource of the LLR resource manager is a database.

3. The transaction system of claim 2, wherein the database stores the transaction log and transaction data.

4. The transaction system of claim 3, wherein the database stores the transaction log and transaction data in an atomic manner.

5. The transaction system of claim 2, wherein the LLR resource manager includes a connection pool used to connect to the database.

6. The transaction system of claim 5, wherein the connection pool is a Java Database Connectivity (JDBC) connection pool.

7. The transaction system of claim 5, wherein a single connection of the connection pool is used to store the transaction log and transaction data into the database.

8. The transaction system of claim 1, wherein the resource of the LLR manager is a messaging system.

9. The transaction system of claim 1, wherein the transaction manager can recover from crashes during the transaction.

10. The transaction system of claim 1, wherein LLR resource manager is part of the resource.

11. The transaction system of claim 1, wherein the resource of the LLR resource manager operates in an atomic manner.

12. A method for processing transactions across a plurality of resources, comprising the steps of:
providing a computer, including a transaction manager for executing thereon, for use in processing transactions across a plurality of resource;
communicating with a plurality of resource managers, including a resource manager associated with each resource that will participate in a transaction, wherein the plurality of resource managers further includes
a logging last resource (LLR) resource manager, that is capable of performing local commit with its associated resource as part of the transaction, and
one or more resource managers, distinct from the LLR resource manager, each of which are capable of performing a two-phase commit with their associated resource as part of the transaction; and
determining which of the plurality of resource managers is the LLR resource manager
sending a prepare command, as part of a two-phase commit process, to each of the one or more resource managers, distinct from the LLR resource manager,
upon receiving a confirmation, from each of the one or more resource managers, distinct from the LLR resource manager, that the prepare commands have succeeded,
providing transaction log information to the LLR resource manager, and
instructing the LLR resource manager to write the transaction log information to persistent storage and atomically therewith locally commit the transaction at its associated resource, and
upon receiving a confirmation, from the LLR resource manager, that the local commit has succeeded, sending a commit command, as part of the two-phase commit process, to each of the one or more resource managers, distinct from the LLR resource manager, to commit the transaction at their associated resources.

13. The method of claim 12, wherein the method is done by a transaction manager.

14. The method of claim 12, wherein the resource of the LLR resource manager is a database.

15. The method of claim 14, wherein the database stores the transaction log and transaction data.

16. The method of claim 15, wherein the database stores the transaction log and transaction data in an atomic manner.

17. The method of claim 14, wherein the LLR resource manager includes a connection pool to connect to the database.

18. The method of claim 17, wherein the connection pool is a Java Database Connectivity (JDBC) connection pool.

19. The method of claim 12, wherein the resource of the LLR manager is a messaging service.

20. A machine readable medium having instructions stored thereon that when read and executed by a computer cause the computer to perform the method comprising:
providing a transaction manager for executing on the computer, for use in processing transactions across a plurality of resource;
communicating with a plurality of resource managers, including a resource manager associated with each resource that will participate in a transaction, wherein the plurality of resource managers further includes
a logging last resource (LLR) resource manager, that is capable of performing local commit with its associated resource as part of the transaction, and
one or more resource managers, distinct from the LLR resource manager, each of which are capable of performing a two-phase commit with their associated resource as part of the transaction; and
determining which of the plurality of resource managers is the LLR resource manager
sending a prepare command, as part of a two-phase commit process, to each of the one or more resource managers, distinct from the LLR resource manager,
upon receiving a confirmation, from each of the one or more resource managers, distinct from the LLR resource manager, that the prepare commands have succeeded,
providing transaction log information to the LLR resource manager, and
instructing the LLR resource manager to write the transaction log information to persistent storage and atomically therewith locally commit the transaction at its associated resource, and
upon receiving a confirmation, from the LLR resource manager, that the local commit has succeeded, sending a commit command, as part of the two-phase commit process, to each of the one or more resource managers, distinct from the LLR resource manager, to commit the transaction at their associated resources.

21. The machine readable medium of claim 20, wherein the method is done by a transaction manager.

22. The machine readable medium of claim 20, wherein the resource of the LLR resource manager is a database.

23. The machine readable medium of claim 22, wherein the database stores the transaction log and transaction data.

24. The machine readable medium of claim 23, wherein the database stores the transaction log and transaction data in an atomic manner.

25. The machine readable medium of claim 22, wherein the LLR resource manager includes a connection pool to connect to the database.

26. The machine readable medium of claim 25, wherein the connection pool is a Java Database Connectivity (JDBC) connection pool.

27. The machine readable medium of claim 20, wherein the resource of the LLR manager is a messaging service.

28. The system of claim 1, wherein the transaction log and one phase commit are stored as part of the same write operation.

29. The system of claim 1, wher0ein the transaction manager checks to see if the transaction log is stored by the LLR resource manager before instructing the two-phase commit resource manager to commit.

30. The method of claim 12, wherein the transaction log and one phase commit are stored as part of the same write operation.

31. The method of claim 12, wherein the transaction manager checks to see if the transaction log is stored by the LLR resource manager before instructing the two-phase commit resource manager to commit.

32. The machine readable medium of claim 20, wherein the transaction log and one phase commit are stored as part of the same write operation.

33. The machine readable medium of claim 20, wherein the transaction manager checks to see if the transaction log is stored by the LLR resource manager before instructing the two-phase commit resource manager to commit.

* * * * *

UNITED STATES PATENT AND TRADEMARK OFFICE
CERTIFICATE OF CORRECTION

| | | |
|---|---|---|
| PATENT NO. | : 7,725,432 B2 | |
| APPLICATION NO. | : 11/130687 | |
| DATED | : May 25, 2010 | |
| INVENTOR(S) | : Thomas E. Barnes et al. | |

It is certified that error appears in the above-identified patent and that said Letters Patent is hereby corrected as shown below:

In column 3, line 41, after "commit" insert -- . --.

In column 11, line 18, after "them" insert -- . --.

In column 17, line 57, after "Tables" insert -- . --.

In column 23, line 6, in claim 29, delete "wher0ein" and insert -- wherein --, therefor.

Signed and Sealed this
Twelfth Day of July, 2011

David J. Kappos
*Director of the United States Patent and Trademark Office*